(12) United States Patent
Sarangapani et al.

(10) Patent No.: US 7,192,993 B1
(45) Date of Patent: Mar. 20, 2007

(54) SELF-HEALING COATING AND MICROCAPSULES TO MAKE SAME

(75) Inventors: Srinivasan Sarangapani, Walpole, MA (US); Ashok Kumar, Champaign, IL (US); Curtis Thies, Henderson, NV (US); Larry D. Stephenson, Champaign, IL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 322 days.

(21) Appl. No.: 10/377,642

(22) Filed: Mar. 4, 2003

(51) Int. Cl.
*B32B 5/16* (2006.01)
*B32B 9/00* (2006.01)
*B32B 15/02* (2006.01)
*C08K 9/00* (2006.01)
*C08K 9/04* (2006.01)

(52) U.S. Cl. .............. 523/200; 427/213; 428/402.21; 523/202; 523/205; 524/86; 524/91; 524/137; 524/211

(58) Field of Classification Search .......... 523/200, 523/202, 205; 524/86, 91, 137, 211; 428/402.21; 427/213
See application file for complete search history.

(56) References Cited

U.S. PATENT DOCUMENTS

| 5,575,841 | A | 11/1996 | Dry |
| 5,660,624 | A | 8/1997 | Dry |
| 5,989,334 | A | 11/1999 | Dry |
| 6,060,152 | A | 5/2000 | Murchie |
| 6,075,072 | A | 6/2000 | Guilbert et al. |
| 6,261,360 | B1 | 7/2001 | Dry |
| 2002/0106454 | A1 | 8/2002 | Trippe et al. |

*Primary Examiner*—Patrick D. Niland
(74) *Attorney, Agent, or Firm*—Earl H. Baugher, Jr.

(57) ABSTRACT

A liquid self-healing coating, incorporating microcapsules filled with tailored repair formulations, repairs itself upon physical compromise after curing. In one embodiment, a commercially available paint primer is mixed with a pre-specified amount of these microcapsules. After the coating has cured on the substrate to which it is applied, any physical compromise of the cured coating results in the microcapsules bursting to release a liquid that fills and seals the compromised volume of the coating. In applications where paint is used to provide corrosion protection, the liquid contains anti-corrosion material as well as suitable diluents and film-forming compounds. In another embodiment, the microcapsules may be provided separately to enhance commercially available products. For example, if a paint formulation is known a priori, specifically configured microcapsules packaged separately from the paint and designed for use with the paint formulation, may be added to the commercially available product just prior to application.

2 Claims, 5 Drawing Sheets

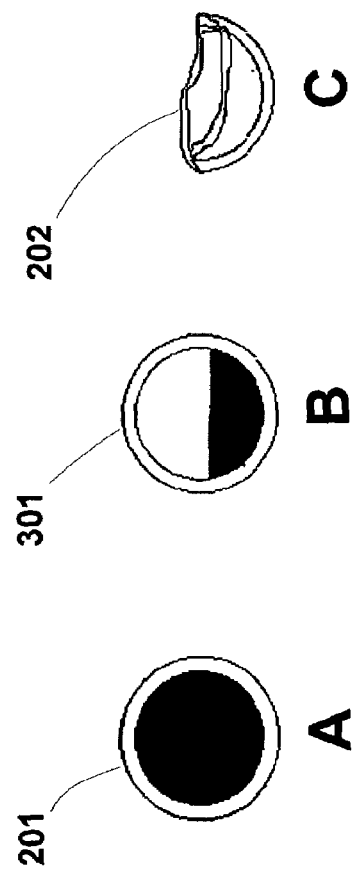
Fig. 3
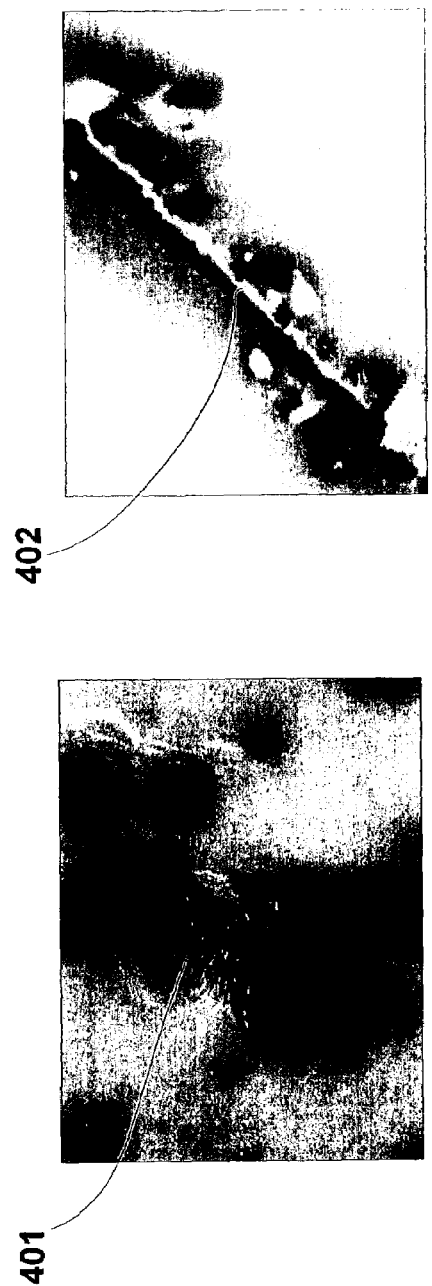
Fig. 4A
Fig. 4B

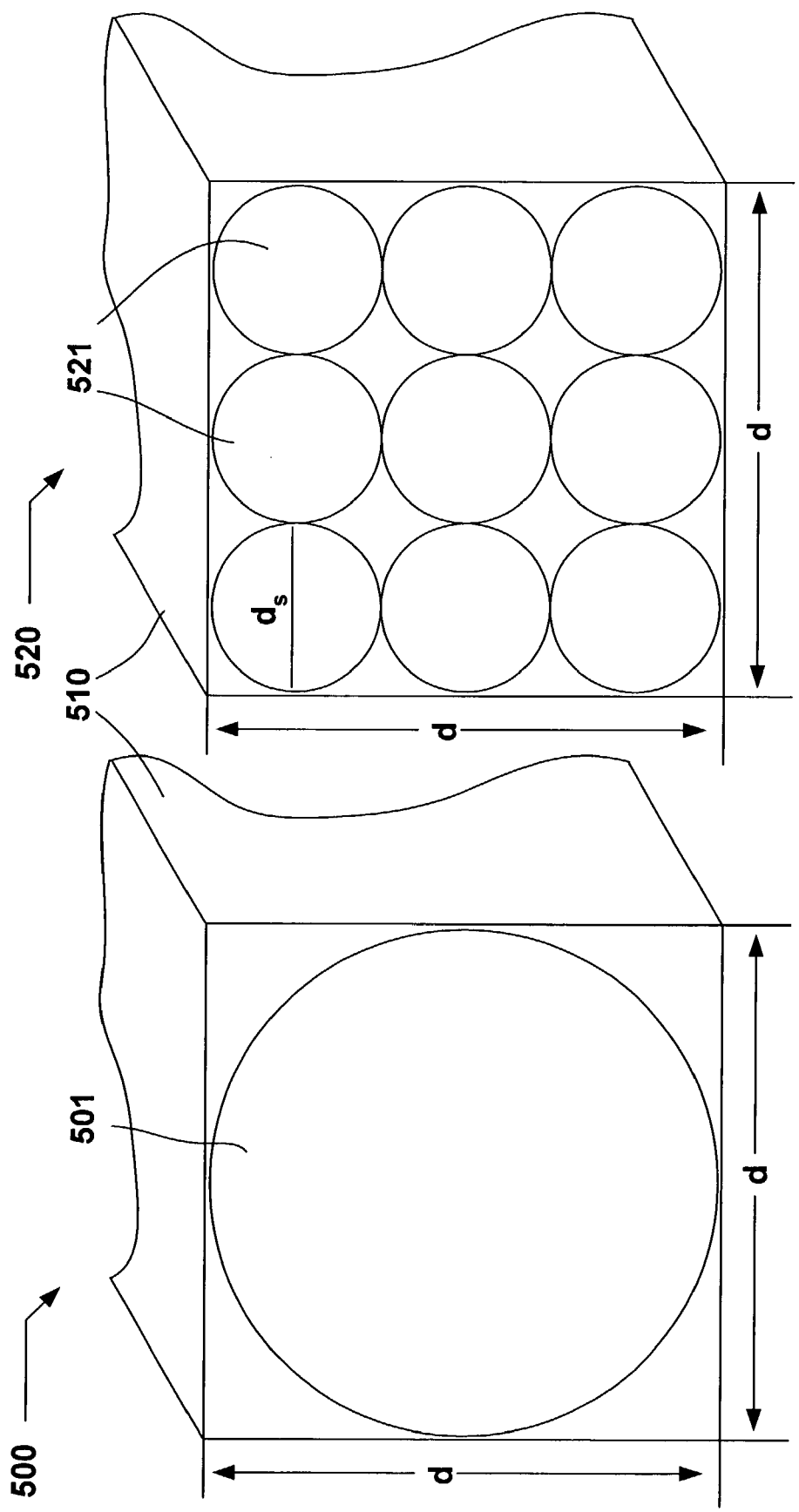

SELF-HEALING COATING AND MICROCAPSULES TO MAKE SAME

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein, but including the entire right, title and interest to only those foreign rights that have not been limited to a paid up royalty free license as a result of an inventor timely asserting retention of foreign rights as provided for in the assignment of the invention to the Government of the United States.

FIELD OF THE INVENTION

The present invention relates generally to liquid coatings, in particular liquid coatings that have been modified to be self-repairing.

BACKGROUND

Much effort and resources are expended in ongoing corrosion control, even when an item has been coated initially to protect it. Abrasion, saltwater, high humidity, ultraviolet light, temperature gradients, and other deleterious environmental factors contribute to this, alone or in combination. To conserve corrosion control resources, it would be beneficial to use not only a "tough" initial protective coating, but also a coating that, when compromised, repairs or "heals" itself.

There have been efforts to effect a self-repairing capability in various materials, notably shaped articles that may be made of materials with a weakness in one or more orientations, such as cementitious materials having inherently poor tensile strength. U.S. Pat. No. 5,575,841, *Cementitious Materials*, to Dry, Nov. 19, 1996, and U.S. Pat. No. 5,660,624 (Aug. 26, 1997), U.S. Pat. No. 5,989,334 (Nov. 23, 1999), and U.S. Pat. No. 6,261,360 B1 (Jul. 17, 2001), each entitled *Self-Repairing Reinforced Matrix Materials*, all to Dry, detail a method of incorporating hollow fibers in "pourable" material to effect a self-repairing function. These inventions employ selectively releasable compounds within the hollow fiber. Because of the size of the fibers, these patents are unsuitable for repair upon a smooth surface.

Microcapsules contain minute amounts of product for specialized delivery, often size, time or location critical. They may be obtained in diameters of less than 250 microns ($\mu$) and have been used in a variety of applications, from the pharmaceutical industry (delivery of drugs) to the textile industry (providing protective wear for HAZMAT workers). One example is U.S. Pat. No. 6,060,152, *Fabric with Microencapsulated Breach Indication Coating*, to Murchie, May 9, 2000. The '152 patent describes a membrane incorporating a number of different microcapsules that alert to even the smallest compromise of the fabric comprising a protective suit such as may be worn by a HAZMAT worker or health professional.

Very recent work to improve coatings by the addition of additives involves only improving the application of the coating to a substrate, not the ability of the coating to "repair" itself upon its compromise. One such example is U.S. patent application no. 2002/0106454 A1, *High Molecular Weight Polymer Additive for Coating and Protective Products*, to Trippe et al., Published Aug. 8, 2002. The '454 published application details the advantages of adding small amounts of an ultrahigh molecular weight polymer, such as polyisobutylene, to enhance coating properties of a solvent. Once, a nick compromises the coating or abrasion, however, another separately applied application is required to protect the substrate.

Another concern in using microcapsules with solvents is the timing of delivery of the encapsulated compound. Prior patents have avoided this timing problem by mixing the microcapsules with dry powder coatings such as are used in "powder coating" applications involving elevated temperatures. U.S. Pat. No. 6,075,072, *Latent Coating for Metal Surface Repair*, to Guilbert et al., Jun. 13, 2000, details a self-repairing compound suitable for use in powder coating. By adding microcapsules of sufficiently small size, i.e., 10–40$\mu$, to a dry powder form of protective coating, the resultant "self-repairing" coating is able to be powder coated upon metal substrates at suitable elevated temperatures that melt the coating to a homogenous continuous surface of approximately 200$\mu$ thickness. The microcapsules used with the '072 patent are mixed with a solvent in the dry state to prevent short-term degradation of the shells by liquid solvents.

Unless appropriate materials are used to fabricate the microcapsule and its contents, it may "deploy" before the coating is applied or, upon application, spontaneously deploy improperly, i.e., without a physical compromise of the coating such as abrasion or nicking. Further, unless the microcapsule is compatible with both its contents (the encapsulated repair compound) and its surrounds (the solvent), the "application" life of the resultant mixed product may be less than desirable. These constraints have been addressed in the present invention.

SUMMARY

In a preferred embodiment of the present invention, urea formaldehyde microcapsules, approximately 60–150 microns ($\mu$) in diameter and containing corrosion inhibitors and several types of film-forming compounds, or "healants," are mixed with commercially available coatings. When the applied modified coating is damaged, e.g., by abrasion through the coating to the substrate on which it is applied, the microcapsules burst, releasing the film forming and corrosion inhibiting compounds. This initiates a self-healing process, i.e., the damaged area of the substrate is covered and repaired, inhibiting corrosion. Steel substrates coated with these modified coatings, or "self-healing systems," were scribed and laboratory tested according to ASTM D 5894, i.e., alternately exposing them to salt spray and ultraviolet (UV) light. ASTM D-5894, *Standard Practice for Cyclic Salt Fog/UV Exposure of Painted Metal*, (*Alternating Exposures in a Fog/Dry Cabinet and a UV Condensation Cabinet*), American Society for Testing Materials, West Conshohocken, Pa. The coated test specimens were evaluated with respect to undercutting at the scribe in accordance with ASTM D 1654. ASTM D 1654, *Standard Practice for Cyclic Salt Fog/UV Exposure of Painted Metal*, (*Alternating Exposures in a Fog/Dry Cabinet and a UV Condensation Cabinet*), American Society for Testing Materials, West Conshohocken, Pa. The undercutting was reduced from 2.12, mm to 0.46 mm at the scribe when employing microcapsules containing phenolic varnish, a long chain polyester diluent, a second carrier/diluent based on high molecular weight hydrocarbons and a corrosion inhibitor. Electrochemical impedance spectroscopy (EIS) tests showed that the incorporation of self-healing microcapsules resulted in significantly higher impedances for damaged "microcapsule coatings" than for the same coatings containing no microcapsules.

Thus, in general, a self-healing coating is provided that, after application and curing upon a substrate, self heals upon its physical compromise. It comprises one or more solvents, one or more solids and microcapsules containing a repair material that may comprise one or more substances. The shell of the microcapsule is resistant to degradation from within by the repair substances. Prior to application of the self-healing coating and after addition of the microcapsules to a solvent/solid mixture, the microcapsules are resistant to short term degradation of the exterior shell by either the solvents or the solids. The microcapsules burst upon physical compromise of the resultant applied and cured coating, releasing the repair substances to seal a volume (void) within the coating cause by the physical compromise. Spherical microcapsules produce a most efficient delivery volume and are preferred. However, other shapes, such as filaments, may be used also, with a concomitant loss of efficiency. In addition to traditional paints, the microcapsules may be used with or deliver greases, lubricants, varnishes, lacquers, shellacs, polyurethanes, waxes, polishes, fabric treatments, waterproofing compounds, liquid roofing coatings, oils, and similar compounds.

The combination of one or more solvents and one or more solids may comprise a protective coating that would serve the purpose of protecting a substrate but not have the self-healing properties of the present invention. This protective coating may be one of a number of commercially available products, to include primer paints, topcoat paints, "one coat" or "self-priming" paints, varnishes, lacquers, polyurethane finishes, shellacs, waxes, polishes, "one step" finishing preparations for wood, metal, or synthetic materials, and combinations thereof. The paint primers may be: polyurethanes, oil-based enamels, enamel undercoater, latex acrylics, acrylic formulations and epoxy formulations. Further, topcoat and self-priming paints may be: polyurethanes, oil-based enamels, enamels, latex acrylics, acrylic formulations and epoxy formulations.

Any of the coatings may serve as a corrosion inhibitor through the addition of suitable corrosion inhibitors or the coatings may be merely decorative.

The shell of the microcapsule may be a sphere with an outer diameter preferably within the approximate range of 50 to 200μ. More preferably, the shell may be a sphere with an outer diameter greater than approximately 63μ. Most preferably, the shell is a sphere with an outer diameter of approximately 150μ.

The shell of the microcapsule may comprise either gelatin or, more preferably, urea formaldehyde (UF).

The repair substances may be a combination of film-forming compounds and corrosion inhibiting compounds. The film-forming compounds may be any of: polybutenes, phenolics, phenolic varnishes, long chain polyester diluents, carrier diluents, and combinations thereof. The corrosion inhibiting compounds may be any of: camphor, alkylammonium salt in xylene, Ciba IRGACOR® 153 (hereafter also anti-corrosion agent A), polyamine fatty acid in salt in ethanol, Ciba IRGACOR® 287 (hereafter also anti-corrosion agent B), and combinations thereof.

The microcapsules are added prior to application as a pre-specified percentage of the dry weight of the solids in the base coating at a pre-specified time prior to application of the self-healing coating. Preferably, the pre-specified percentage lies in the approximate range of 10 to 40% and the microcapsules are added within fourteen (14) days of application. Most preferably, the pre-specified percentage is approximately 25% and the microcapsules are added when preparing the coating for application.

Also provided is the microcapsule suitable for adding to available protective coatings to facilitate self-healing thereof after application and curing. In general, this microcapsule comprises a repair substance and a shell enclosing a volume containing the repair substance. Upon application of the protective coating to a substrate and curing of the coating thereon, physical damage to the resultant coating ruptures the shell of the microcapsules in the vicinity of the damage and deploys the repair substance into a volume (void) within the coating caused by the physical damage.

The shell of the microcapsule may be a sphere with an outer diameter preferably within the approximate range of 50 to 200μ. More preferably, the shell has an outer diameter greater than approximately 63μ. Most preferably, the shell has an outer diameter of approximately 150μ.

The shell of the microcapsule may be gelatin, or preferably urea formaldehyde (UF). The repair substance contained therein may comprise film-forming compounds and corrosion inhibiting compounds.

The film-forming compounds may be any of: polybutenes, phenolics, phenolic varnishes, and combinations thereof. The diluents may be any of: long chain polyester diluents, carrier diluents, and combinations thereof. The corrosion inhibiting compounds may be any of: camphor; alkylammonium salt in xylene, commercially available as Ciba IRGACOR® 153 (anti-corrosion agent A); polyamine fatty acid in salt in ethanol, commercially available as Ciba IRGACOR® 287 (anti-corrosion agent B); and combinations thereof.

Also provided is a method for making a self-healing coating. It comprises: (a) providing a non-self healing coating; (b) providing microcapsules filled with a repair substance compatible with the non-self healing coating; and (c) mixing the microcapsules into the non-self healing coating such that the microcapsules are fully wetted and interspersed evenly throughout the non-self healing coating.

Further provided is a method for producing a self-healing coating upon a substrate. It comprises: (a) providing a non-self healing coating; (b) providing microcapsules filled with a repair substance compatible with the non-self healing coating; (c) mixing the microcapsules into the non-self healing coating such that the microcapsules are fully wetted and interspersed evenly throughout the non-self healing coating; (d) applying the self-healing coating to the substrate by any of a number of means selected from the group consisting of: brushing, rolling, spraying, and combinations thereof; and (e) permitting the applied self-healing coating to cure prior to use of the substrate.

Advantages of preferred embodiments of the present invention include:

reduced need for maintenance and renewal of applied protective coatings;

reduced maintenance costs;

increased intervals between required inspections;

reduced life cycle costs;

improved appearance of the substrate over its design life;

increased service life of an item protected with the self-healing coating; and increased mean time between failure (MTBF).

Further advantages of the present invention will be apparent from the description below with reference to the accompanying drawings, in which like numbers indicate like elements.

BRIEF DESCRIPTION OF THE DRAWINGS

FIG. 3 depicts a suggested mechanism for the collapse of microcapsules in wet coatings.

FIG. 4A is a micrograph showing the effect of burst UF microcapsules incorporated in applied coatings of the present invention in which a crack is induced in the coating.

FIG. 4B is a micrograph showing the effect of burst UF microcapsules incorporated in applied coatings of the present invention in which the coating has been scribed.

FIG. 5A depicts a cross section through a cube containing a single large microcapsule that may be used in a preferred embodiment of the present invention.

FIG. 5B depicts a cross section through the cube of FIG. 5A with a superimposed symmetric array of nine small microcapsules that fit in the same cube containing the large microcapsule of FIG. 5A.

DETAILED DESCRIPTION

Figure 1A:
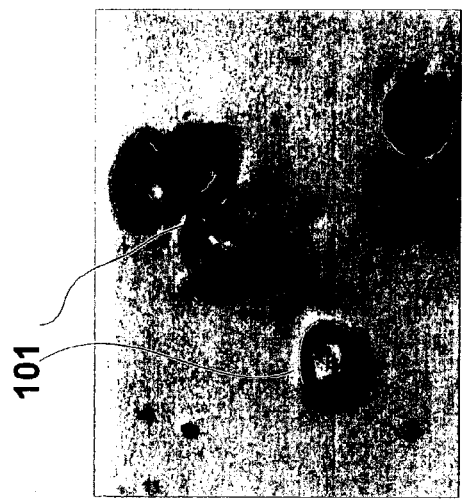
FIG. 1A is a micrograph typical of small gelatin microcapsules (<63μ diameter) as collapsed when immersed in wet polyurethane when investigated for possible use in the present invention.

A preferred embodiment of the present invention provides a "self-healing" coating system that may be used for corrosion protection, such as on outdoor steel cabinet enclosures for electrical equipment. Microcapsules in the form of microscopic spheres with a diameter of 50–200μ, and more preferably of 63–150μ diameter, are used to encapsulate "coating repairing" compounds as a means of effecting self-healing of the applied coating thus derived. These microcapsules are fabricated for optimum dispersal into various coating formulations, e.g., paint, enabling release of the coating repairing or "self-healing" compounds. These compounds may comprise, at least in part, corrosion-inhibiting constituents. Thus, when the applied coating is mechanically ruptured such as may occur upon damage by impact or abrasion, these compounds are "deployed." Corrosion-inhibiting microcapsules may be used in coating systems to minimize damage caused by scratches or abrasions by releasing specially formulated chemicals that flow into the damaged areas forming thin films of corrosion protection.

For paint systems, self-healing coatings are fabricated by adding microcapsules containing at least one "self-healing" compound to commercially available paint primers. Paint primers may include those paints commercially termed "one coat" or "self-priming." The microcapsules release the self-healing compound or compounds, most commonly as liquids, when the coating system is damaged. Urea formaldehyde (UF) microcapsules of 50–150μ in diameter have been added to primers with an applied thickness of 0.1 mm (0.004") to increase the coating service life by "self-healing" damaged areas. Verification of performance was conducted by accelerated corrosion testing on conventional coating systems using ASTM D 5894 and Electrochemical Impedance Spectroscopy (EIS). M. Kendig and J. Scully, *Basic Aspects of Electrochemical Impedance Applications for the Life Prediction of Organic Coatings on Metals, Corrosion*, Vol. 46, No. 1, pp. 22–29, 1990. H. Hack and J. Scully, *Defect Area Determination of Organic Coated Steels in Seawater Using the Breakpoint Frequency Method, J. Electrochem. Soc.*, Vol. 138, No. 1, pp. 33–40, 1991.

One of the primary concerns in using microcapsules in coatings that contain solvents is the maintenance of structural integrity of the microcapsule until application of the coating and evaporation of the solvent or solvents. A laboratory study was undertaken to determine the stability of both urea formaldehyde (UF) and gelatin as shell materials as well as the propensity of the microcapsules to release the "self-healing" compounds only when the applied coating is physically damaged. The gelatin and UF capsules are filled with red dye as a tracer to facilitate evaluation.

Achieving timely and appropriate rupturing of microcapsules to be incorporated in applied coatings is crucial to developing and commercializing "self-healing" coatings. "Timely and appropriate rupturing" occurs, for example, when the applied coating is damaged physically or if cracks develop in the applied coating. Microcapsules may exhibit at least two major "improper rupturing" modes; viz., rupturing before the coating is applied to a surface and spontaneous rupturing on the surface of applied coatings prior to cracking or physical damage.

To determine the stability of the microcapsules in various coating formulations, samples of each are bottled. Samples are extracted from each bottle and placed on glass slides. Initial optical micrographs of each are taken. After initial sampling, each bottle is tightly sealed. Optical micrographs of each sample are taken weekly over a period of four (4) weeks, and deterioration (if any) as a function of time is noted. A listing of the types and quantities of tested microcapsules, designated as: small (<63μ), medium (63–150μ), and large (>150μ), is shown in Table 1.

TABLE 1

Wet Coatings Investigated for Stability of Microcapsules

| SAMPLE NUMBER | TYPE OF PAINT AND AMOUNT (grams) | | SIZE OF CAPSULES AND AMOUNT (grams) | |
|---|---|---|---|---|
| 1 | Polyurethane | 35 | Medium | 0.6 |
| 2 | Polyurethane | 100 | Medium | 0.3 |
| 3 | Polyurethane | 100 | Large | 0.6 |
| 4 | Polyurethane | 100 | Small | 0.6 |
| 5 | Oil-based enamel (flat white) | 100 | Medium | 0.6 |
| 6 | Acrylic primer (latex) | 100 | Medium | 0.6 |
| 7 | Interior enamel (latex acrylic) | 100 | Medium | 0.6 |
| 8 | Enamel under coater | 100 | Medium | 0.6 |
| 9 | Acrylic primer (latex) | 50 | Small | 0.6 |

Figure 1B:
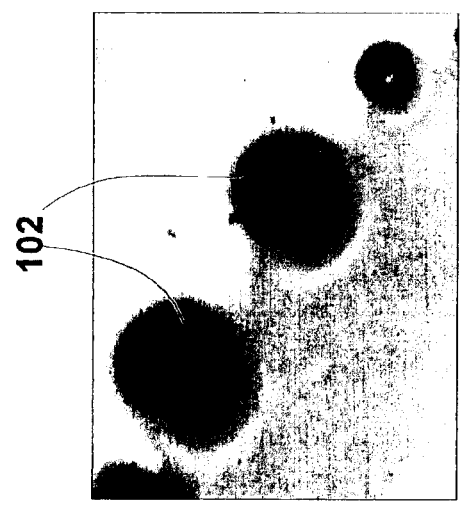
FIG. 1B is a micrograph typical of medium gelatin microcapsules (63–150μ diameter) after two (2) hours immersion in wet polyurethane when investigated for possible use in the present invention.
Figure 2A:
FIG. 2A is a micrograph typical of large urea-formaldehyde (UF) microcapsules (>150μ diameter) after two (2) weeks immersion in wet polyurethane when investigated for possible use in the present invention.
Figure 2B:
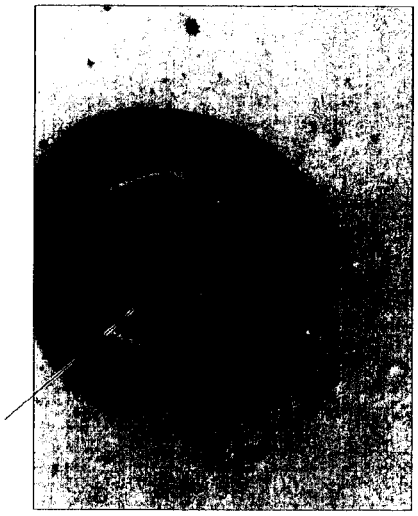
FIG. 2B is a micrograph typical of large urea-formaldehyde (UF) microcapsules (>150μ diameter) deteriorating after four (4) weeks immersion in wet polyurethane when investigated for possible use in the present invention.

Refer to the micrographs of FIG. 1. Small gelatin microcapsules 101 (diameters less than 63μ) failed to maintain structural integrity and self ruptured in polyurethane and other coatings in a few days. A micrograph typical of collapsed small gelatin microcapsules 101 is shown in FIG. 1A. As depicted in FIG. 1B after two hours immersion in polyurethane, medium (63–150μ) gelatin microcapsules 102 maintain integrity somewhat longer than a few days. As shown in the micrograph of FIG. 2A, large UF microcapsules 201 (diameter greater than 150μ) maintained integrity for at least two (2) weeks. However, as shown in the micrograph of FIG. 2B, even the large UF microcapsules 201 began to collapse 202 and lose core material after four (4) weeks immersion in wet polyurethane.

A suggested mechanism for the collapse of microcapsules immersed in wet coatings is illustrated in FIG. 3. Upon initial introduction of microcapsules to the wet coating as shown at A, the pressure inside the microcapsule 201 from the compound or compounds contained therein counteracts the pressure from the wet coating (not shown separately) surrounding the microcapsule 201, thus maintaining microcapsule structural integrity. Diffusion of core material as at B (from inside the microcapsule 201 through its shell to the outside) creates empty space 301 in the cavity of the microcapsule 201, disrupting the pressure balance aforementioned. After substantial compound (core material) diffuses from a microcapsule 201, as at C, the microcapsule collapses 202 inward.

Small gelatin microcapsules 101 are not appropriate for wet coatings if immersed therein more than two (2) weeks. The reason for this poor stability may be due to attack of the gelatin by the solvents either internal to the shell, i.e., the core material, external to the shell, i.e., the wet coating, or both. Further, even UF microcapsules 201 immersed in wet coatings have a relatively short shelf life, thus, in a preferred embodiment of the present invention, microcapsules 201 should be mixed into the wet coating at the time of application.

For best results, UF microcapsules 201 greater than about 63μ in diameter should be employed for the containment and delivery of the self-healing compounds (core material). Larger microcapsules 201 contain and deliver more core material once ruptured than the smaller microcapsules 101. Also, there is a higher probability of rupturing a small number of large microcapsules 201 than rupturing a large number of small microcapsules 101 to deliver the same volume of core material.

Refer to FIG. 5. Consider, for example, a simple cube 500, 520 of dimension, d, on a side with a distribution of one or more microcapsules therein. The volume of a sphere is $\frac{4}{3}\pi r^3$, where $r=d/2$. Thus, volume in terms of d is $\frac{4}{3}\pi(d/2)^3$ or $\frac{1}{6}\pi d^3$. If as shown by comparing the microcapsules (spheres) in FIG. 5A to those in FIG. 5B, the volume of the spheres of FIG. 5B, i.e., ⅓ the diameter of the large sphere of FIG. 5A, is given by $\frac{1}{6}\pi(d/3)^3$ or $\frac{1}{6}\pi d^3/27$. Thus, assuming "perfect packing" of 27 small spheres of diameter d/3 in the same cube of dimension d, the same amount of core material is available within the cube. "Perfect packing" of the cube may be impossible to achieve but does serve to illustrate the point theoretically. As an example, for a large single microcapsule 501 just fitting the cube 510 of dimension d, its diameter d may be 150μ. A perpendicular cutting plane of 150×150μ will completely sever this single large microcapsule 501, delivering a volume of $1.8\times10^6\mu^3$. As depicted only in cross section 520 in FIG. 5B, the equivalent volume of the same cube 510 may be filled by 27 smaller microcapsules 521, each of diameter, $d_s=50\mu$, where $d_s=d/3$. However, a perpendicular cutting plane of the same area (150×150μ) as used in FIG. 5A will completely sever only nine (9) of the small microcapsules 521. This yields a combined volume of $0.6\times10^6\mu^3$ of core material, only ⅓ of the single large microcapsule 501 of FIG. 5A. Thus, even under the assumption of optimal packing for the small microcapsules 521, the larger microcapsules 501 will deliver microcapsule contents over an optimum area of compromise, thus assuring the opportunity of assuring a better seal along the perimeter of the compromise. Microcapsules much greater than 150μ in diameter are too large for many coating applications, as conventional paint films (primers+topcoats) are only eight (8) mils (200μ) in thickness for both coats. Thus, microcapsules of 63–150μ are recommended for typical applications of these types of coatings.

Microcapsules incorporated in coatings to be applied to steel substrates for corrosion testing preferably have core compositions with corrosion inhibiting "healants," such as film-forming compounds containing polybutene or phenolics, and one or more pre-specified corrosion inhibiting compounds. As well, core material contains certain diluents that facilitate flow of the film-forming compounds upon rupture of the microcapsule. Primers and topcoats may be chosen from among acrylics and epoxy formulations. In all cases, the primers and topcoats and the core materials must be selected to not degrade the preferred UF shell material used in formulating the microcapsule.

Coatings used in testing preferred embodiments of the present invention include a paint primer, DEXTER 10PW20-4 WATER REDUCIBLE EPOXY PRIMER, Dexter-Hysol Company, and a paint topcoat, SHERWIN-WILLIAMS DURA-POX WATER-BASED EPOXY FINISH, Sherwin-Williams Paint Company. Samples were applied to steel panels (not shown separately except for partial representation in the micrographs of FIGS. 1, 2 and 4) obtained from Q-Panel Laboratory Products, Cleveland, Ohio 44145. They are described as Type R39 and conform to ASTM Specification A366, D609-Type 1. The panels are 3"×9"×0.032".

Microcapsules are added to the mixed primer at 25% weight based upon the dry solids contained in the primer. Microcapsules are added directly to the primer in small portions with slow mixing until all of the microcapsules appear to be wetted. The primer and topcoat are applied using a drawdown bar. The samples are dried for one to two days after the primer is applied and for two (2) weeks after the topcoat is applied.

Microcapsules selected for evaluation are UF shells of 63–150 micron diameter with core materials selected from the following candidates: phenolic varnish; a long chain polyester diluent; Iso decyl diphenyl phosphate, commercially available as SANTICIZER® 148, Solutia, Inc., St. Louis, Mo.; a second carrier/diluent, modified partially hydrogenated terphenol, commercially available as THERMINOL®66, Solutia, Inc., St. Louis, Mo.; and either camphor or a corrosion inhibitor in either of two forms as alkylammonium salt in xylene, commercially available as Ciba IRGACOR® 153 or polyamine fatty acid in salt in ethanol, commercially available as Ciba IRGACOR® 287, Ciba Geigy Company. The only difference in the three microcapsule core materials that were tested is in the addition of one extra component in each. The extra component in the microcapsules designated "A" is anti-corrosion agent A; that designated "C" is anti-corrosion agent B and that designated "D" is camphor.

Four (4) sets of samples of three (3) panels each are tested. The edges and backs of all coated steel panel samples are sealed using a coal tar epoxy composition. The first set is the control, having no microcapsules in the coating. Three sets are formulated similarly to the control except for incorporating microcapsules in the primer at 25% of dry weight of solids in the primer. After allowing the samples to cure fully, two scribe marks are made on each sample panel per ASTM D 1654.

Accelerated corrosion testing for 2016 hours is accomplished under ASTM D 5894. ASTM D5894 testing combines the environmental effects of salt spray and UV light, simulating exposure to field conditions. In addition, electrochemical impedance spectroscopy (EIS) evaluations were performed on some samples subsequent to the ASTM D 5894 tests in order to determine the relative degree of coating degradation at the scribed area.

Representative self-healing "deployments" are shown in FIG. 4. FIG. 4A depicts the rupture pattern 401 of UF microcapsules upon inducing a crack in the applied coating while FIG. 4B depicts the rupture "line" 402 of UF microcapsules upon scribing the applied coating.

Figure 6:
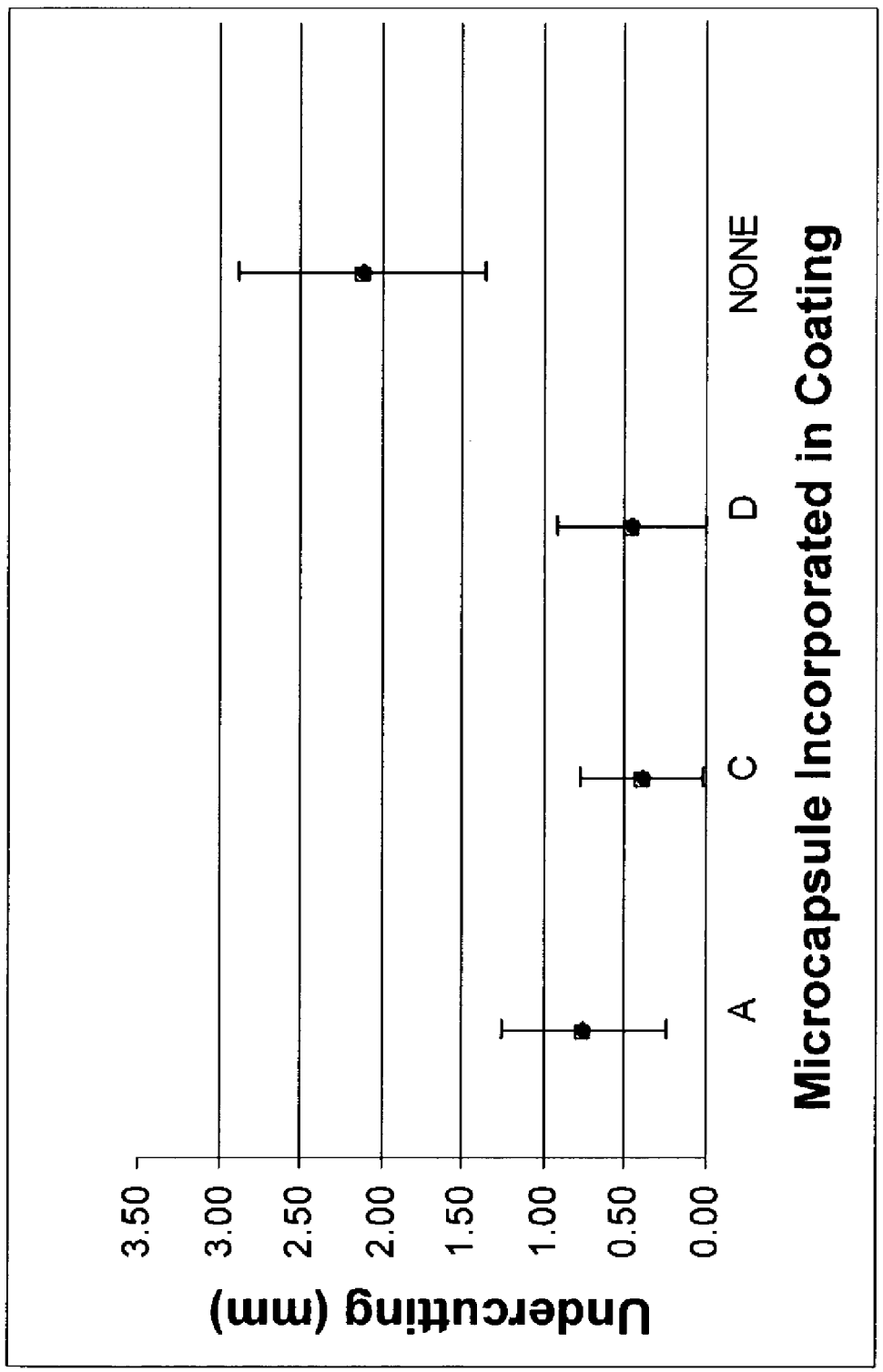
FIG. 6 details the test results for the control and the three (3) self-healing coatings that may be employed as a preferred embodiment of the present invention.

Results for the "control" and the three (3) self-healing coatings, as formulated with microcapsules of three different compositions, are shown in FIG. 6. The amount of undercutting for each panel is determined by taking the mean maximum of the coating loss extending between the top and bottom of each of two scribe marks, according to the procedure recommended by ASTM D 1654. These results are shown as a plot of mean undercutting (in mm) for all microcapsules in each sample set by microcapsule type for the four sample types (three microcapsule formulations A, C, D and a control or None). This clearly shows that addition of microcapsules with "self-healing" compounds and corrosion inhibitors significantly reduces undercutting at the scribe, compared to the control coatings containing no microcapsules. For example, the undercutting was reduced from a mean value of 2.12 mm for the control to a mean value of 0.39 mm for the coatings containing the "C" microcapsules.

Further, differences were noted among the undercutting results for the three separate microcapsule formulations. The coatings with the "C" microcapsules (mean undercutting of 0.39 mm) that contained anti-corrosion agent "B", performed only slightly better than the "D" microcapsules, containing the camphor (mean undercutting of 0.46 mm). However, coatings with either the "C" or "D" microcapsules performed significantly better than coatings with the "A" microcapsules, containing anti-corrosion agent "A" (mean undercutting of 0.75 mm). Undercutting measurements taken in this way provide a measure of the relative ability of the coating system to adhere at the scribe where corrosion is taking place, and to resist underfilm corrosion.

Performance of epoxy-based primers is enhanced by the addition of appropriately fabricated microcapsules. Burst microcapsules counteract the effects of ultraviolet light and salt spray exposure, releasing "healing compounds" when damaged, e.g., by scribing. The core material in the microcapsules fulfilled expectations. The phenolic varnish acted as a film-former to seal the edges of the damaged coating. The diluents functioned as a low viscosity carrier/diluent for the other components. The camphor, and the two anti-corrosion agents, A and B, functioned as viable corrosion control agents to provide additional corrosion protection over at least part of the scribed region.

Figure 7:
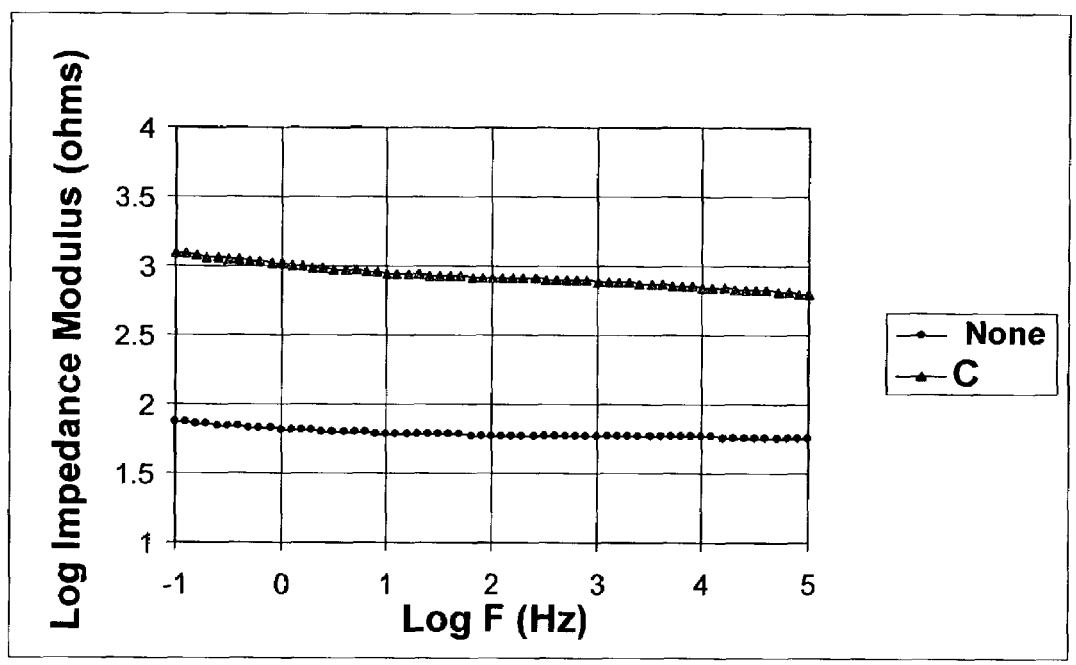
FIG. 7 depicts the relationship between impedance and frequency for both a control sample and a preferred embodiment of the present invention using data taken with Electrochemical Impedance Spectroscopy (EIS).
Figure 8:
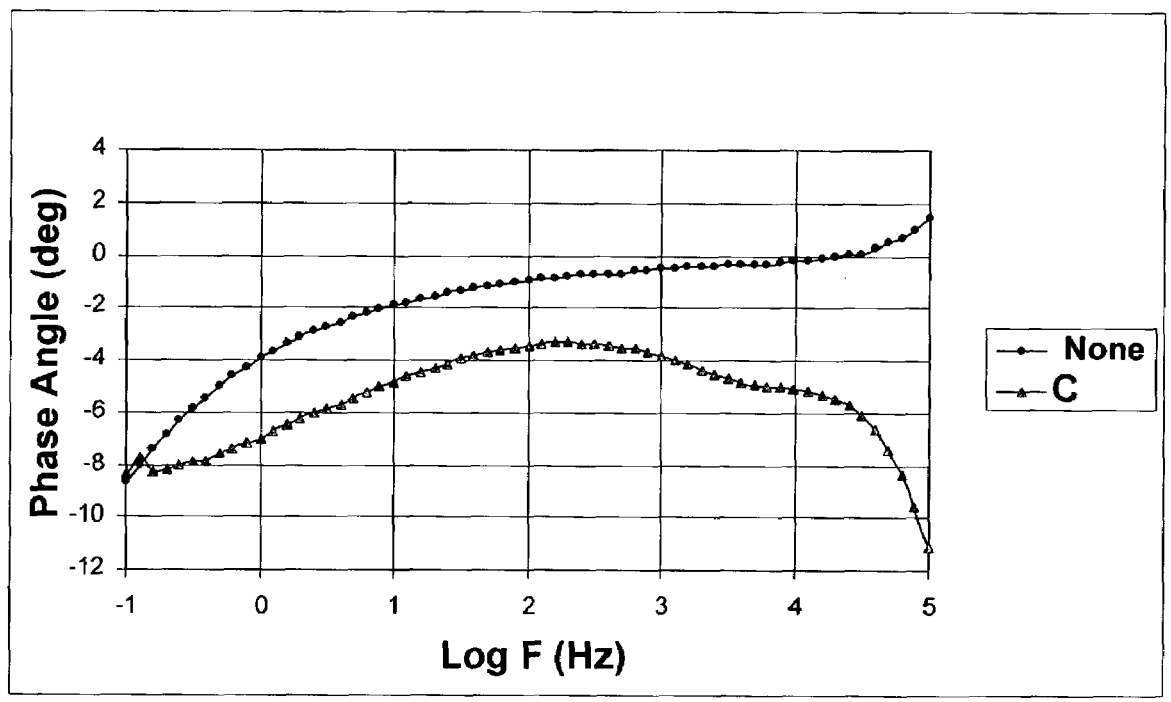
FIG. 8 depicts the relationship between phase angle and frequency for both a control sample and a preferred embodiment of the present invention using data taken with EIS.

Refer to FIGS. 7 and 8. Electrochemical impedance spectroscopy (EIS) is performed on the scribed area of one of the coating system samples containing the "C" microcapsules in the coating, and on the scribed area of one of the control samples after both were subjected to the ASTM D 5894 test. The EIS results are presented in FIG. 7 as Log Impedance Modulus ($\Omega$) vs. Log Frequency (Hz), and in FIG. 8, as Phase Angle (deg) vs. Log Frequency (Hz), respectively. Over a frequency range of 100 KHz to 0.1 Hz, the impedance moduli of the scribed areas of either the control coating or the "C" microcapsule coating did not change significantly. Note however, that the impedance modulus of the scribed area of the sample containing the "C" microcapsules is about 16 times greater than the impedance modulus of the scribed area of the coating with no microcapsules. This is an objective indicator of the "C" microcapsules having sealed the substrate, preventing further growth of the scribed area. The phase angles for both coatings display slightly negative values, with a suggestion of less on-going corrosion of the "C" microcapsule sample. The phase angles for coatings with the "C" microcapsules display a slightly more capacitive behavior, as would be expected for an uncompromised coating. Thus, the EIS results are consistent with the undercutting measurements previously described.

While the invention has been described in terms of its preferred embodiments, those skilled in the art will recognize that the invention may be practiced with modifications within the spirit and scope of the appended claims. For example, although the system is described in specific examples for paints, it is amenable for use with other coatings that one desires to prolong in an uncompromised state or to retain an original capacity for protection, regardless of outward appearance. These coatings may include merely decorative coatings as well as the aforementioned corrosion inhibiting coatings. Thus, it is intended that all matter contained in the foregoing description or shown in the accompanying drawings shall be interpreted as illustrative rather than limiting, and the invention should be defined only in accordance with the following claims and their equivalents.

We claim:

1. A self-healing coating that repairs itself upon physical compromise of an application of said self-healing coating that was cured at ambient temperature, comprising:
   at least one liquid COTS coating; and
   microcapsules, having a shell defining a volume of a sphere with an outer diameter of approximately 150µ, said volume containing at least one repair substance, said microcapsules wet mixed into said liquid COTS coating just prior to application of said self-healing coating,
   wherein said shell is resistant to degradation by said repair substance; and
   wherein prior to application of said self-healing coating and after addition of said microcapsules to said liquid COTS coating, said microcapsules are resistant to short term degradation by said liquid COTS coating; and
   wherein said microcapsules in the area of a physical compromise of said applied and cured self-healing coating burst, releasing said at least one repair sub stance to fill and seal the compromised volume within said self-healing coating.

2. A microcapsule suitable for wet mixing in a liquid COTS coating to produce a self-healing coating cured at ambient temperature, said microcapsule comprising:
  a repair substance; and
  a shell enclosing a volume containing said repair substance, in which said shell is a sphere with an outer diameter of approximately 150μ,
whereupon application of said self-healing coating to a substrate and curing of said self-healing coating thereon, physical compromise of said self-healing coating results in rupture of said shells near said physical compromise and deployment of said repair substance to fill and seal the compromised volume within said self-healing coating.

* * * * *